United States Patent [19]
Montgomery, deceased et al.

[11] 3,937,344
[45] Feb. 10, 1976

[54] APPARATUS FOR TRANSPORTING AND HANDLING LARGE LOADS OF BUILDING MATERIALS

[76] Inventors: Thurman Rex Montgomery, deceased, late of Hurst, Tex., by Billie Jo Montgomery, executrix, 2017 Hurstview Drive, Hurst, Tex. 76053

[22] Filed: Oct. 31, 1974

[21] Appl. No.: 519,439

[52] U.S. Cl. ............... 214/505; 214/84; 214/85; 214/1 Q
[51] Int. Cl.² ........................................ B60P 1/28
[58] Field of Search ...... 214/505, 501, 84, 85, 85.5, 214/1 Q, 340, 318

[56] References Cited
UNITED STATES PATENTS

| | | | |
|---|---|---|---|
| 1,778,003 | 10/1930 | Tuerck | 214/1 Q |
| 1,967,683 | 7/1934 | Ostrander | 214/1 Q |
| 2,514,680 | 7/1950 | Stafford | 214/340 X |
| 2,569,050 | 9/1951 | Gref et al. | 214/84 X |
| 3,178,044 | 4/1965 | Phillips | 214/85.1 |

*Primary Examiner*—Albert J. Makay
*Attorney, Agent, or Firm*—Eddie E. Scott

[57] ABSTRACT

An apparatus for transporting and unloading large loads of wallboard is disclosed. A base frame with wheels allows the apparatus to be moved over a surface. An upper frame is positioned above the base frame. The upper frame includes a curved member that extends convexly away from the upper frame. Means are provided between said base frame and said curved member for allowing said upper frame to move relative to said base frame. A lock means selectively prevents said curved member and upper frame from moving relative to said base frame.

6 Claims, 3 Drawing Figures

APPARATUS FOR TRANSPORTING AND HANDLING LARGE LOADS OF BUILDING MATERIALS

BACKGROUND OF THE INVENTION

The present invention relates to the art of material handling and more particularly to a device for transporting and handling a large flat elongated load.

The transportation and handling of a flat elongated load such as a load of building materials made up of sheetrock, plywood, wallboard and other materials of similar shape has always been a difficult and time consuming operation, generally requiring two or more workers. These materials are bulky and heavy and certain individual varities of these materials are relatively fragile and may be easily damaged. It is very often necessary to transport the load through narrow passageways. For example, at the construction site the load of materials will be transported through doors and hallways and between obstacles. The materials will then be placed in a horizontal position for further distribution or for stacking. The load of materials should be as large as possible. A need clearly exists for simple device that will allow one man to transport a large flat elongated load of building materials through narrow passages and then unload it in a simple and expedient manner.

An apparatus for transporting and unloading a flat elongated load is shown in U.S. patent application Ser. No. 101,883 filed Dec. 28, 1970 now U.S. Pat. No. 3,680,715 to Thurman R. Montgomery, patented Aug. 1, 1972. The load is positioned and secured on an L-shaped frame. Wheels on the bottom of the frame allow the load to easily be transported through narrow passageways. Curved members on the side of the frame allow the frame and material to be placed in a horizontal position and unloaded by tipping the frame onto the curved members. Although this system has proven to be very effective in transporting and handling flat elongated loads certain difficulties were encountered with the apparatus.

A certain amount of difficulty has been encountered with this apparatus in tipping the frame and load over onto the curved members. An individual would push on the side opposite from the curved members to tip the frame and load onto the curved members. If the apparatus was constructed so that it could be easily tipped over it was not as stable as desirable when transporting the load from place to place and if the apparatus was constructed so that it was completely stable during transportation a great deal of effort was required to tip the frame and load onto the curved members. The curved members would strike the floor with some impact and on occasion would damage the floor. In addition the frame would rock for a period of time after it was tipped onto the curved members and the frame tended to kick back after the load moved onto the floor. This apparatus would not carry as large of a load as might be desired. Since the load must pass through narrow passages the width of the apparatus and load is limited by the width of the most narrow passage that will be encountered by the apparatus. This is usually a doorway. It will be appreciated that a need clearly exists for a building materials handling apparatus that will carry the largest possible load and will not impact the floor when the load is unloaded.

DESCRIPTION OF THE PRIOR ART

The most extensive prior art method of transporting and handling building materials is simply by two or more workers carrying sections of the material and depositing them at the desired location. This however includes the disadvantages and problems associated with the great weight of the materials, the possibility of the materials being damaged and the amount of time consumed by the operation.

The use of load dollies and platform trucks also is known in handling building materials. This however has the disadvantage that the materials are generally laid on the dolly or platform truck in a horizontal position and it is impossible to transport them through narrow passages. In addition, much time and energy is wasted handling the materials when loading and unloading. If the materials are placed on the dolly or platform truck in a vertical position to allow it to be transported through narrow passages, at least two workers are required to steady the load and the loading and unloading of the dolly is difficult.

In U.S. Pat. No. 3,680,715 to Thurman R. Montgomery patented Aug. 1, 1972 an apparatus for transporting and unloading a flat elongated load is shown. The load is positioned and secured on an L-shaped frame. Wheels on the bottom of the frame allow the load to easily be transported through narrow passageways. Curved members on the side of the frame allow the frame and material to be placed in a horizontal position and unloaded by tipping the frame onto the curved members. A certain amount of difficulty has been encountered with this apparatus in tipping the frame and load over onto the curved members. An individual would push on the side opposite from the curved members to tip the frame and load onto the curved members. If the apparatus was constructed so that it could be easily tipped over it was not as stable as desirable when transporting the load from place to place and if the apparatus was constructed so that it was completely stable during transportation a great deal of effort was required to tip the frame and load onto the curved members. The curved members would strike the floor with some impact and on occasion would damage the floor. In addition the frame would rock for a period of time after it was tipped onto the curved members and the frame tended to kick back after the load moved onto the floor. This apparatus would not carry as large a load as might be desired. Since the load must pass through narrow passages the width of the apparatus and load is limited by the width of the most narrow passage that will be encountered by the apparatus.

SUMMARY OF THE INVENTION

The present invention provides an apparatus for transporting and unloading large loads of building materials. The large loads may be transported through narrow doorways and passages and easily and swiftly unloaded at the desired location. The apparatus consists of a base frame with wheel means that allow the base frame to be moved over a surface. An upper frame is positioned above the base frame. The upper frame includes a curved member that extends convexly away from the upper frame. Means are provided between said base frame and said curved member for allowing said upper frame to move relative to said base frame. A lock means selectively prevents said curved member and upper frame from moving relative to said base frame. The above and other objects and advantages of the present invention will become apparent from a consideration of the following detailed description of the invention when taken in conjunction with the accompanying drawings.

DETAILED DESCRIPTION OF THE INVENTION

Figure 1:
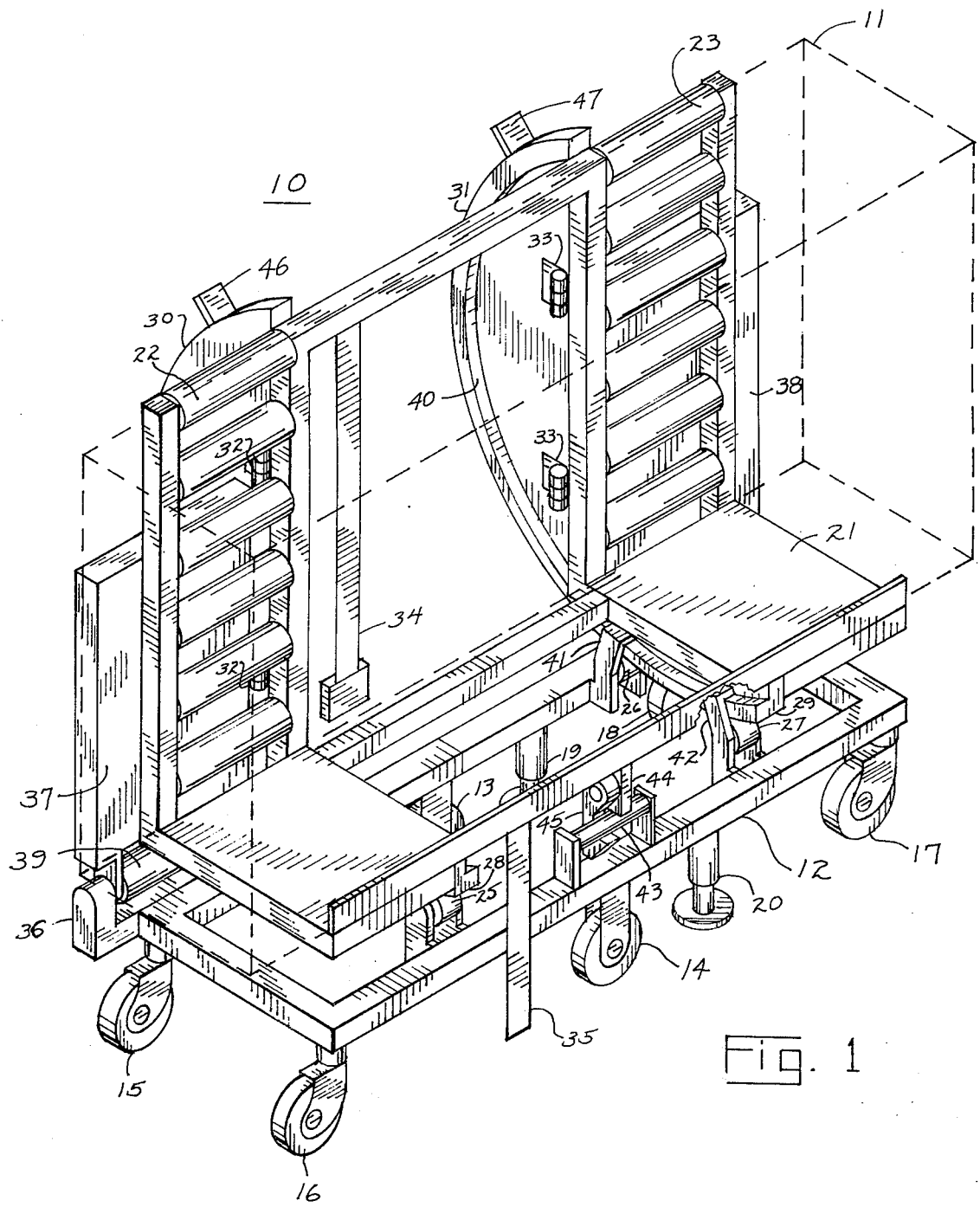
FIG. 1 is a perspective view of an apparatus constructed in accordance with the present invention.

Referring now to the drawings and to FIG. 1 in particular, a materials handler 10 constructed in accordance with the present invention is shown. The handler 10 includes a base frame 12. Six wheels are connected to the base frame 12 to allow the base frame 12 to be moved freely and easily over a surface. Wheels 13, 14, 15, 16, 17, and 18 are shown connected to the base frame 12. The wheels 15, 16, 17, and 18 are in the form of casters to allow the handler 10 to be easily maneuvered around obstacles and through passages. A pair of floor locks 19 and 20 are provided on the base frame 12. The floor locks 19 and 20 may be selectively extended to contact the floor to brake the handler 10 and hold it in place on the floor.

An upper frame 21 is positioned above the base frame 12. The upper frame 21 is adapted to receive a load 11. Two conveyor sections 22 and 23 extend along the upper frame 21. The purpose of the conveyor sections 22 and 23 will become apparent as this description proceeds. Two curved members extend convexly away from the upper frame 21. The curved members are in two sections. The first curved member includes a fixed section 28 and a retractable section 30. The second curved member includes a fixed section 29 and a retractable section 31. The curved members consisting of fixed sections 28 and 29 and retractable sections 30 and 31 rest on rollers 24, 25, 26, and 27 on the base frame 12. The curved members are adapted to move on rollers 24, 25, 26, and 27 and turn upper frame 21 relative to base frame 12. The curved members and base frame 12 include means that cooperate to insure that the upper frame 21 will remain in place on the base frame 12. As shown in FIG. 1, the sections 29 and 31 of the second curved member include a ridge 40 that fits beneath brackets 41 and 42 on the base frame 12. The ridge 40 moves between roller 26 and bracket 41 as the upper frame 21 is being turned and is held in place by roller 26 and bracket 41. This prevents the upper frame 21 from becoming separated from the base frame 12. Similarily, the ridge 40 moves between roller 27 and bracket 42 and is held in place by roller 27 and bracket 42. Corresponding ridge, rollers and brackets are located on the first curved member and base frame 12 respectively.

In order for the apparatus 10 to be able to move through the narrow passageways and yet carry the largest possible load the retractable curved sections 30 and 31 are adapted to swing to the side of the upper frame 21. A pair of inner hinges 33 are mounted between curved section 31 and upper frame 21. Curved section 31 may be rotated toward the upper frame 21 pivoting about hinges 33. A similar set of inner hinges (not shown) are mounted between curved section 30 and upper frame 21 to allow the curved section 30 to be rotated toward the upper frame 21. A set of outer hinges 32 are mounted on retractable curved section 30 and a corresponding set of outer hinges (not shown) are mounted on retractable curved section 31. The outer hinges lock the retractable sections 30 and 31 to upper frame 21 when the hinge pins are in place and allow the retractable sections 30 and 31 to swing inward toward the upper frame 21 when the hinge pins are removed. It will be appreciated that the hinge pins of the outer hinges 32 could be left in place and the hinge pins of the inner hinges 33 removed to allow the retractable sections 30 and 31 to swing outward toward upper frame 21.

Belts 34 and 35 may be secured around the load to secure the load in place on the upper frame 21. The upper frame is selectively locked to the base frame 12 by a latch member 45 connected to the upper frame 21 that engages a latch bar 43 on the base frame 12. The latch member 45 and a latch stop 43 are affixed to the upper frame 12 and act to selectively lock the upper frame 21 to the latch bar 43 affixed to the base frame 12. A pair of ramps 37 and 38 are connected to the base frame 12 by a ramp support frame 36 that allows the ramps to be rotated relative to the base frame. A ramp roller 39 is also mounted on the ramp support frame 36. A pair of stops 46 and 47 extend from the first and second curved members.

Figure 2:
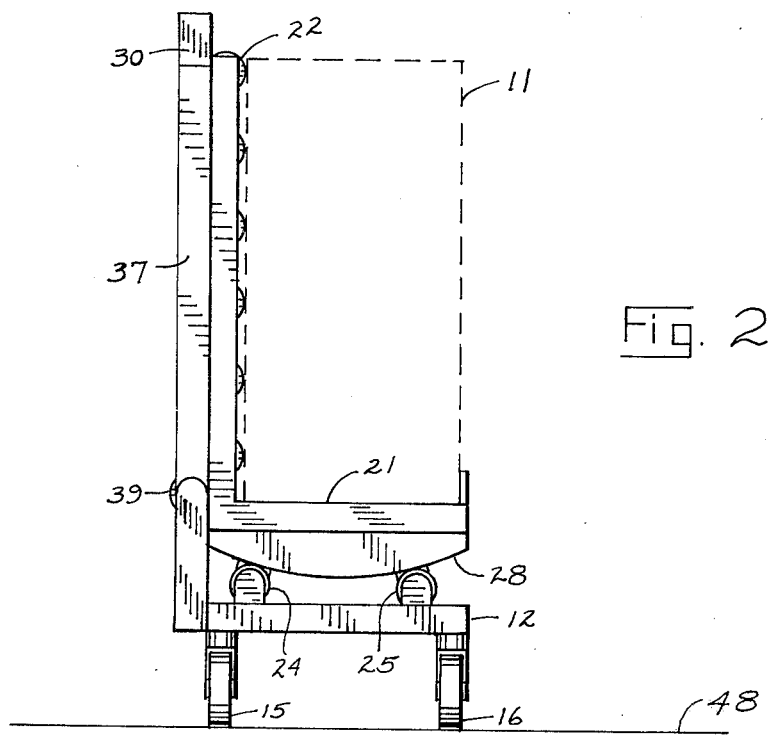
FIG. 2 is an end view of the apparatus shown in FIG. 1 with the load in position for transportation.

The structural details of a building materials handler 10 having been described, the operation of transporting a load of building materials will now be considered. The load 11 is placed upon the upper frame 21 of the apparatus 10 and secured thereto by belts 34 and 35. As shown in FIG. 2 the retractable sections 30 and 31 of the curved members are turned inward against the upper frame 21. This decreases the width of the apparatus 10 so that the width of the apparatus 10 is only slightly wider than the width of the load 11. The load 11 may be transported through narrow doorways and other passages. The ramps 37 and 38 are also carried against the upper frame 21 to provide the apparatus 10 with a minimum width while carrying a maximum load.

The curved members rest upon the rollers and the upper frame 21 is held in place on the base frame 12 by the ridges on the curved member that are engaged by the rollers and brackets on the base frame 12. The apparatus 10 and load 11 may be transported over floor 48 to the desired location on the wheels extending from the base frame 11. Since the wheels on each end of the apparatus are in the form of casters the apparatus 10 may be maneuvered with ease.

Figure 3:
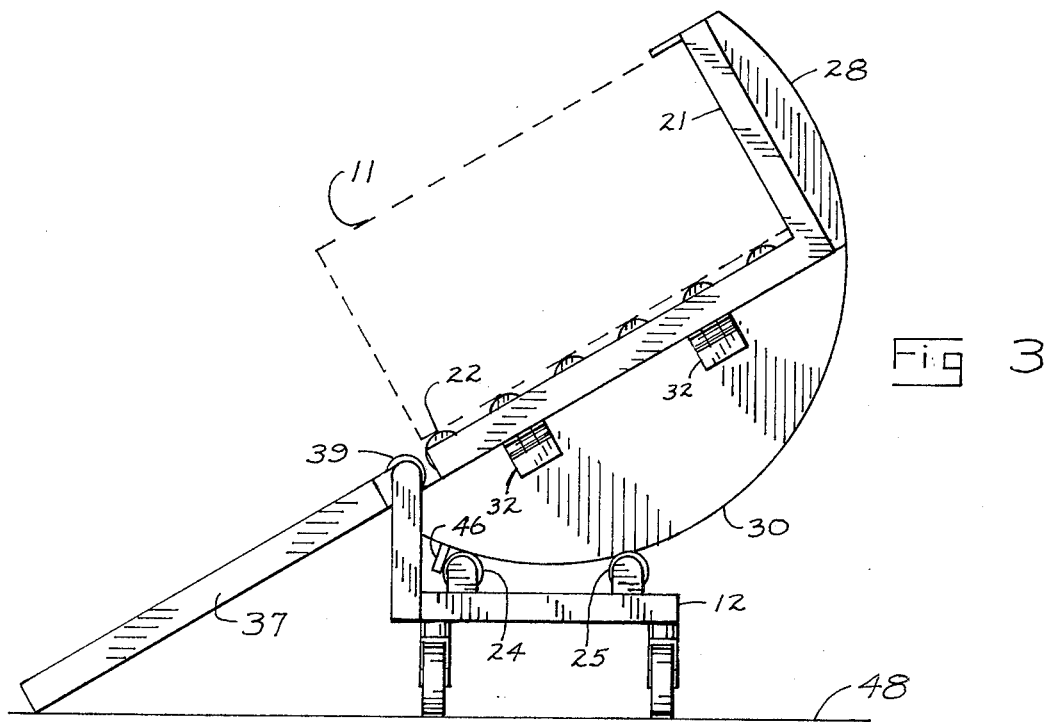
FIG. 3 is an end view of the apparatus shown in FIG. 1 and FIG. 2 with the load being unloaded.

Once the apparatus 10 and load 11 reach the desired location the load may be unloaded onto the floor in a simple and expedient manner without damage to the building materials that make up the load 11. Referring to FIG. 3 the apparatus 10 is shown in position for unloading. The floor locks or floor jacks 19 and 20 shown in FIG. 1 are extended and the apparatus 10 is firmly locked to the floor to prevent it from moving when the load 11 moves off of the apparatus 10. The retractable sections 30 and 31 have been moved into place in alignment with the fixed sections 28 and 29 respectively. The hinge pins are in place in the inner and outer hinges to firmly lock the retractable sections 30 and 31 to the fixed sections 28 and 29. The latch element 45 shown in FIG. 1 has been disconnected from the latch bar 43. The ramps 37 and 38 have been lowered into contact with the floor 48. The upper frame 21 is rotated relative to the base frame 12. The curved members roll freely on the rollers since the load is substantially pivoting about its center of gravity. The load 11 moves off of upper section 21 onto the ramps 37 and 38 and onto the floor 48. The conveyor sections 22 and 23 and ramp rollers 39 allow the load to move easily and quickly off of upper frame 21 with damage to the load 21 being held to an absolute minimum. The upper frame may then be rotated back to the upright position and the apparatus 10 transported back for another load.

What is claimed is:

1. An apparatus for transporting a load through narrow passageways and unloading the load at a desired location, comprising:
   a base frame,
   wheel means connected to said base frame for allowing said base frame to be moved,
   an upper frame positioned above said base frame, said upper frame having a lower load receiving portion normally positioned substantially parallel to said base frame and an unloading section projecting substantially perpendicular upward from said load receiving portion,
   said upper frame having curved members extending convexly away from said unloading section of said upper frame,
   hinge means between said curved members and said unloading section,
   means between said base frame and said curved members for allowing said upper frame to move relative to said base frame, and
   lock means for selectively preventing said upper frame from moving relative to said base frame and for selectively allowing said upper frame to move relative to said base frame and unload said load.

2. The apparatus of claim 1 wherein said means between said base frame and said curved members for allowing said upper frame to move relative to said base frame consists of a multiplicity of rollers.

3. The apparatus of claim 2 including an elongated ramp connected to said base frame by a hinge means.

4. The apparatus of claim 3 including conveyor sections on said upper frame.

5. An apparatus for transporting a load of building materials and depositing said load of building materials at a desired location, comprising:
   a base frame;
   wheels on said base frame for allowing said base frame to traverse a surface;
   an upper frame for receiving said load positioned above said base frame, said upper frame having a lower load receiving portion normally positioned substantially parallel to said base frame and an unloading section projecting substantially perpendicular upward from said load receiving portion;
   a pair of curved members connected to said upper frame, said curved members extending convexly away from said upper frame;
   hinge means between said curved members and said unloading section;
   rollers on said base frame that contact said curved members to allow said upper frame and load to be rotated relative to said base frame and deposit said load at the desired location; and
   a lock for selectively locking said upper frame to said base frame to prevent the upper frame from rotating relative to said base frame and for selectively allowing said upper frame to move relative to said base frame and unload said load.

6. The apparatus of claim 5 including an elongated ramp connected to said base frame by a hinge means.

* * * * *